(12) United States Patent
Okubo

(10) Patent No.: US 11,816,902 B2
(45) Date of Patent: Nov. 14, 2023

(54) VEHICLE EXTERNAL ENVIRONMENT RECOGNITION APPARATUS

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 219 days.

(21) Appl. No.: 17/411,809

(22) Filed: Aug. 25, 2021

(65) Prior Publication Data
US 2022/0067393 A1   Mar. 3, 2022

(30) Foreign Application Priority Data

Aug. 26, 2020   (JP) ................................. 2020-142364
May 17, 2021   (JP) ................................. 2021-082892

(51) Int. Cl.
*G06V 20/56*   (2022.01)
*G06T 7/70*    (2017.01)
*G06T 7/20*    (2017.01)

(52) U.S. Cl.
CPC ............... *G06V 20/56* (2022.01); *G06T 7/20* (2013.01); *G06T 7/70* (2017.01); *G06T 2207/30252* (2013.01); *G06V 2201/08* (2022.01)

(58) Field of Classification Search
CPC .... G06V 20/56; G06V 2201/08; G06V 20/58; G06T 7/20; G06T 7/70; G06T 2207/30252; G06T 2207/20021; G06T 2207/30261; G06T 7/238
See application file for complete search history.

(56) References Cited

U.S. PATENT DOCUMENTS

| 2006/0002587 | A1* | 1/2006 | Takahama | .............. | G08G 1/167 701/45 |
| 2015/0073705 | A1* | 3/2015 | Hiwatashi | .............. | G01S 19/13 701/468 |
| 2016/0379069 | A1* | 12/2016 | Kasaoki | ................. | G06V 10/50 348/148 |

(Continued)

FOREIGN PATENT DOCUMENTS

| JP | 3349060 B | 11/2002 |
| JP | 2012-221126 A | 11/2012 |

*Primary Examiner* — Md K Talukder
(74) *Attorney, Agent, or Firm* — McDermott Will & Emery LLP

(57) ABSTRACT

A vehicle external environment recognition apparatus to be applied to a vehicle includes one or more processors and one or more memories configured to be coupled to the one or more processors. The one or more processors are configured to: calculate three-dimensional positions of respective blocks in a captured image; group the blocks to put any two or more of the blocks that have the three-dimensional positions differing from each other within a predetermined range in a group and thereby determine three-dimensional objects; identify each of a preceding vehicle of the vehicle and a sidewall on the basis of the determined three-dimensional objects; and track the preceding vehicle. The one or more processors are configured to determine, upon tracking the preceding vehicle, whether the preceding vehicle to track is to be hidden by the sidewall on the basis of a border line between a blind region and a viewable region.

4 Claims, 11 Drawing Sheets

(56) References Cited

U.S. PATENT DOCUMENTS

| | | | |
|---|---|---|---|
| 2017/0177955 A1* | 6/2017 | Yokota | G06V 20/56 |
| 2017/0294128 A1* | 10/2017 | Lai | G06V 20/56 |
| 2018/0319280 A1* | 11/2018 | Kim | G08G 1/163 |
| 2019/0087963 A1* | 3/2019 | Umegatani | G06T 7/13 |
| 2019/0197704 A1* | 6/2019 | Okubo | G06T 7/12 |
| 2020/0317113 A1* | 10/2020 | Dingli | B60Q 1/143 |
| 2020/0361482 A1* | 11/2020 | Choi | B60W 50/14 |
| 2021/0300402 A1* | 9/2021 | Wendland | H04W 4/40 |
| 2021/0374412 A1* | 12/2021 | Cerri | G06T 7/90 |
| 2022/0067393 A1* | 3/2022 | Okubo | G06T 7/70 |
| 2022/0144273 A1* | 5/2022 | Yamaguchi | B60W 30/18159 |

* cited by examiner

VEHICLE EXTERNAL ENVIRONMENT RECOGNITION APPARATUS

CROSS-REFERENCE TO RELATED APPLICATIONS

The present application claims priority from Japanese Patent Applications No. 2020-142364 filed on Aug. 26, 2020, and 2021-082892 filed on May 17, 2021, the entire contents of each which are hereby incorporated by reference.

BACKGROUND

The technology relates to a vehicle external environment recognition apparatus that identifies a three-dimensional object.

Japanese Unexamined Patent Application Publication No. 2012-221126 discloses a technique that detects a preceding vehicle in front of an own vehicle and reduces an influence of contact between an own vehicle and the preceding vehicle and a technique that controls the own vehicle to follow the preceding vehicle while maintaining a safe distance from the preceding vehicle.

SUMMARY

An aspect of the technology provides a vehicle external environment recognition apparatus to be applied to a vehicle. The vehicle external environment recognition apparatus includes one or more processors and one or more memories. The one or more memories are configured to be coupled to the one or more processors. The one or more processors are configured to cooperate with one or more programs included in the one or more memories to: calculate three-dimensional positions of respective blocks in a captured image; group the blocks to put any two or more of the blocks that have the three-dimensional positions differing from each other within a predetermined range in a group and thereby determine three-dimensional objects; identify a preceding vehicle relative to the vehicle and a sidewall on the basis of the determined three-dimensional objects; and estimate a future position of the preceding vehicle to track the preceding vehicle. The one or more processors are configured to determine, upon tracking the preceding vehicle, whether the preceding vehicle to track is to be hidden by the sidewall on the basis of a border line between a blind region and a viewable region.

An aspect of the technology provides a vehicle external environment recognition apparatus to be applied to a vehicle, the vehicle external environment recognition apparatus includes one or more processors and one or more memories. The one or more memories are configured to be coupled to the one or more processors. The one or more processors are configured to cooperate with one or more programs included in the one or more memories to: calculate three-dimensional positions of respective blocks in a captured image; group the blocks to put any two or more of the blocks that have the three-dimensional positions differing from each other within a predetermined range in a group and thereby determine three-dimensional objects; identify two or more preceding vehicles relative to the vehicle on the basis of the determined three-dimensional objects, the preceding vehicles including a first preceding vehicle; and estimate a future position of the first preceding vehicle to track the first preceding vehicle. The one or more processors are configured to determine, upon tracking the first preceding vehicle, whether the first preceding vehicle to track is to be hidden by a second preceding vehicle on the basis of a positional relationship between the preceding vehicles. The second preceding vehicle is one of the preceding vehicles other than the first preceding vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
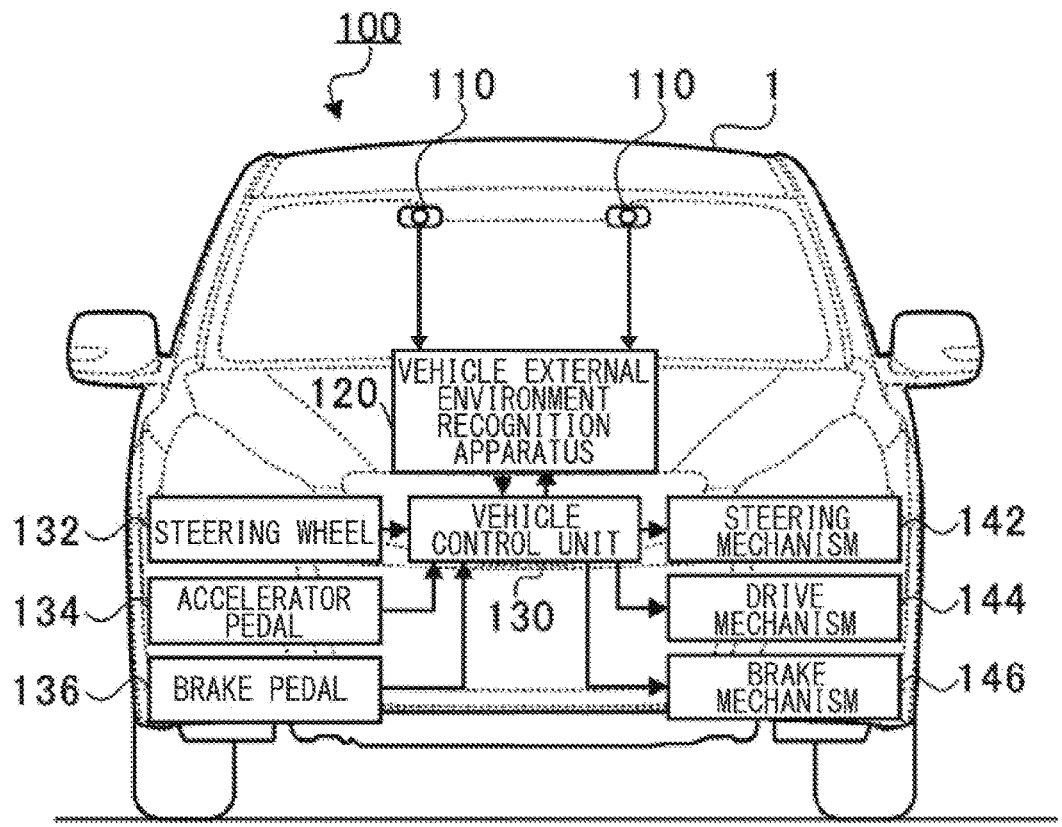
FIG. 1 is a block diagram illustrating an example of a coupling relationship in a vehicle external environment recognition system.

In order to reduce an influence of contact between an own vehicle and a preceding vehicle, or in order to perform a control of following the preceding vehicle, the own vehicle may first determine a three-dimensional object present in a traveling direction and determine whether the determined three-dimensional object is an identification object such as a preceding vehicle. Further, the own vehicle may track the identified preceding vehicle to perform various controls related to the preceding vehicle.

However, in a case where the own vehicle is traveling on a curved road, the preceding vehicle to track may sometimes be hidden by a sidewall present on the side of the road or by another preceding vehicle present closer to the own vehicle than the preceding vehicle to track. In such a case, the own vehicle may be prevented from tracking the preceding vehicle and may mistakenly recognize another identification object as the preceding vehicle to track.

It is desirable to provide a vehicle external environment recognition apparatus that is able to reduce mistakes in recognizing a preceding vehicle to track.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

[Vehicle External Environment Recognition System 100]

FIG. 1 is a block diagram illustrating a coupling relationship in a vehicle external environment recognition system 100. The vehicle external environment recognition system 100 may be provided in an own vehicle 1. The vehicle external environment recognition system 100 may include, for example but not limited to, imaging units 110, a vehicle external environment recognition apparatus 120, and a vehicle control unit 130.

The imaging units 110 may each include an imaging device such as a charge-coupled device (CCD) or a complementary metal-oxide semiconductor (CMOS). For example, two imaging units 110 may be disposed to be away from each other in a substantially horizontal direction in such a manner that optical axes of the respective imaging units 110 are substantially parallel to each other and are each parallel to a traveling direction of the own vehicle 1. The imaging units 110 may each perform imaging of an external environment in front of the own vehicle 1, and generate a luminance image that includes at least luminance information. The luminance image may be a color image or a monochrome image. The imaging units 110 may each continuously generate the luminance images of three-dimensional objects present in a detection region in front of the own vehicle 1 for each frame of 1/60 seconds, i.e., at a frame rate of 60 fps, for example. Non-limiting examples of the three-dimensional object and the identification object to be recognized by the vehicle external environment recognition apparatus 120 may include an independently present object and an object identifiable as a portion of the independently present object. Non-limiting examples of the independently present object may include a bicycle, a pedestrian, a vehicle, a traffic light, a road sign, a guardrail, a building, and a sidewall on the side of a road. Non-limiting examples of the object identifiable as a portion of the independently present object may include a rear surface of a vehicle, a side surface of a vehicle, and a wheel of a bicycle. As used herein, the "rear surface of a vehicle" refers to a surface, of another vehicle in front of the own vehicle 1, opposed to the own vehicle 1 and does not refer to a surface of the own vehicle 1 on the rear side thereof.

The vehicle external environment recognition apparatus 120 may acquire the luminance images from the two respective imaging units 110, and generate distance images by so-called pattern matching. The vehicle external environment recognition apparatus 120 may group blocks on the basis of the luminance images and the distance images. The vehicle external environment recognition apparatus 120 may put any two or more blocks that are located above a road surface, have the same color value, and have respective pieces of three-dimensional position information that are adjacent to each other in a group as a three-dimensional object. Further, the vehicle external environment recognition apparatus 120 may determine which kind of identification object the three-dimensional object is. For example, the vehicle external environment recognition apparatus 120 may identify the three-dimensional object as a preceding vehicle. Upon identifying the preceding vehicle, the vehicle external environment recognition apparatus 120 may perform a control of reducing an influence of contact between the own vehicle 1 and the preceding vehicle, or may perform a following control of causing the own vehicle 1 to follow the preceding vehicle. Examples of operation of the vehicle external environment recognition apparatus 120 will be described later in detail.

The vehicle control unit 130 may include, for example but not limited to, an electronic control unit (ECU). The vehicle control unit 130 may receive input of operation performed by an occupant such as a driver via devices including, without limitation, a steering wheel 132, an accelerator pedal 134, and a brake pedal 136, and transmit the information of the input to mechanisms including, without limitation, a steering mechanism 142, a drive mechanism 144, and a brake mechanism 146, thereby controlling the own vehicle 1. Further, the vehicle control unit 130 may control each of the steering mechanism 142, the drive mechanism 144, and the brake mechanism 146 in accordance with an instruction given by the vehicle external environment recognition apparatus 120.

[Vehicle External Environment Recognition Apparatus 120]

Figure 2:
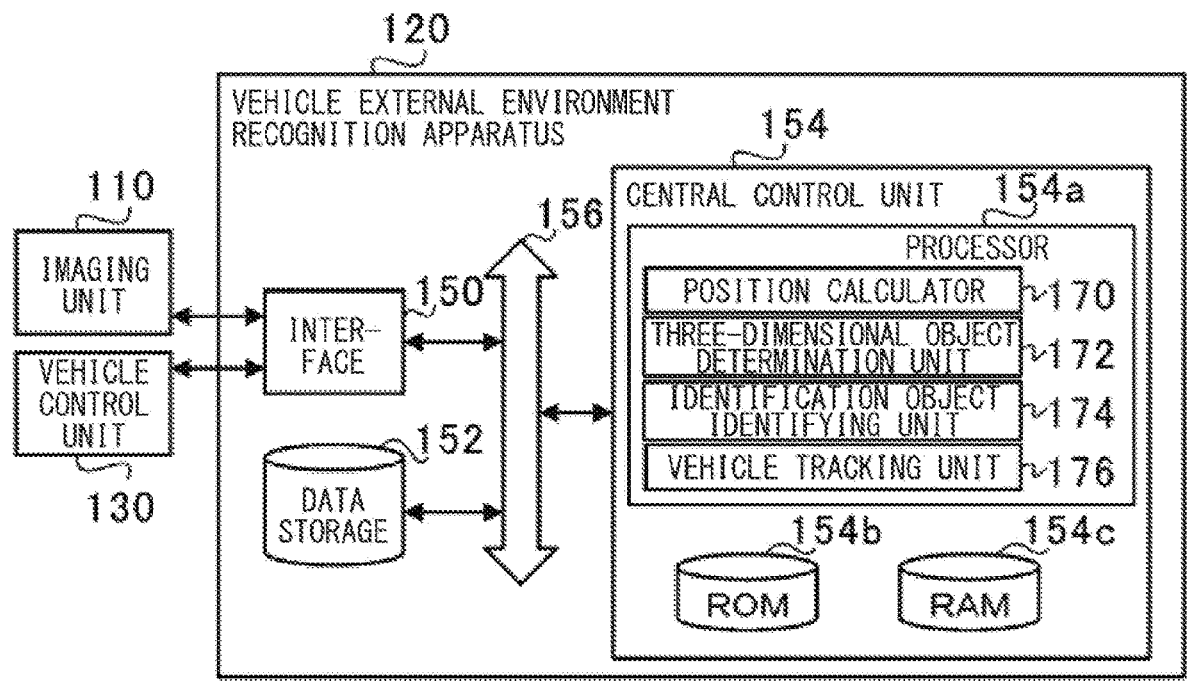
FIG. 2 is a block diagram illustrating an example of a schematic configuration of the vehicle external environment recognition apparatus.

FIG. 2 is a block diagram illustrating an example of a schematic configuration of the vehicle external environment recognition apparatus 120. As illustrated in FIG. 2, the vehicle external environment recognition apparatus 120 may include an interface 150, a data storage 152, and a central control unit 154.

The interface 150 may allow for bi-directional information exchange between the vehicle external environment recognition apparatus 120 and each of the imaging unit 110 and the vehicle control unit 130. The data storage 152 may include a device such as a random-access memory (RAM), a flash memory, or a hard disk drive (HDD). The data storage 152 may store various pieces of information necessary for processing to be performed by the units described below.

The central control unit 154 may include a semiconductor integrated circuit that includes, for example but not limited to, a processor 154a, a read-only memory (ROM) 154b, and a RAM 154c. The ROM 154b may store information such as a program. The RAM 154c may serve as a work area. The central control unit 154 may control the unit such as the interface 150 or the data storage 152 via a system bus 156. The ROM 154b and the RAM 154c may be sometimes referred to as a memory together. In the example embodiment, the processor 154a, the ROM 154b, and the RAM 154c in the central control unit 154 may cooperate with each other to also serve as a position calculator 170, a three-dimensional object determination unit 172, an identification object identifying unit 174, and a vehicle tracking unit 176. In the following, a vehicle external environment recognition method is described in detail also with reference to operation of each unit of the central control unit 154.

[Vehicle External Environment Recognition Method]

Figure 3:
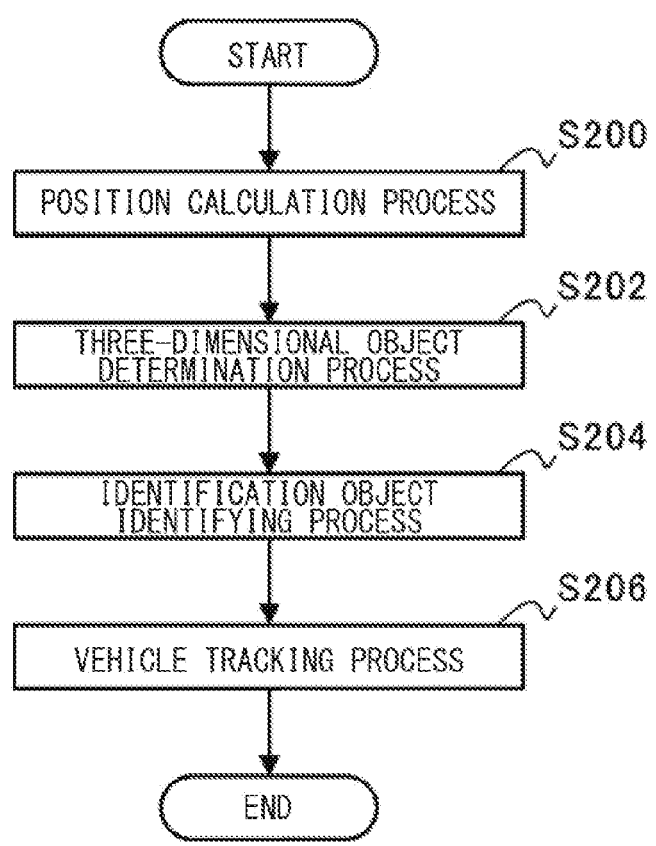
FIG. 3 is a flowchart illustrating an example of a flow of processes in a vehicle external environment recognition method.

FIG. 3 is a flowchart illustrating a flow of processes in the vehicle external environment recognition method. The vehicle external environment recognition apparatus 120 may execute the processes in the vehicle external environment recognition method every predetermined interruption time.

In the vehicle external environment recognition method, the position calculator 170 may calculate three-dimensional positions of respective blocks in the luminance images acquired from the imaging units 110 (position calculation process S200). The three-dimensional object determination unit 172 may group the blocks to determine three-dimensional objects (three-dimensional object determination process S202). The identification object identifying unit 174 may identify a preceding vehicle and a sidewall on the basis of the determined three-dimensional objects (identification object identifying process S204). The vehicle tracking unit 176 may estimate a future position of the preceding vehicle to track the preceding vehicle (vehicle tracking process S206).

[Position Calculation Process S200]

Figure 4A:
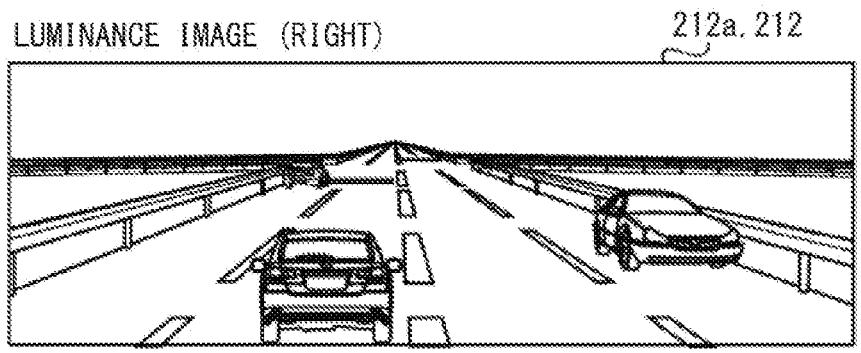
FIGS. 4A to 4C are explanatory diagrams for describing examples of a luminance image and a distance image.
Figure 4B:
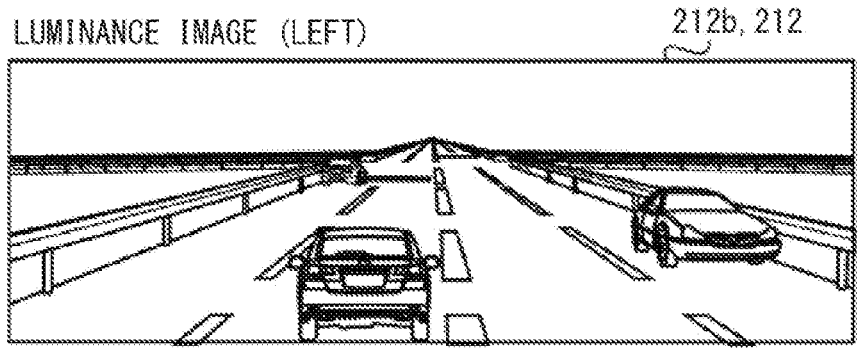
Figure 4C:

FIGS. 4A to 4C are explanatory diagrams for describing the luminance image and the distance image. The position calculator 170 may acquire two or more luminance images that have been captured by the respective imaging units 110 at substantially the same timing with different optical axes. In this example, the position calculator 170 may acquire two luminance images. Assume that the position calculator 170 acquires a first luminance image 212a illustrated in FIG. 4A and a second luminance image 212b illustrated in FIG. 4B as the luminance images 212. The first luminance image 212a may be captured by the imaging unit 110 positioned relatively on the right of the own vehicle 1. The second luminance image 212b may be captured by the imaging unit 110 positioned relatively on the left of the own vehicle 1.

Referring to FIGS. 4A and 4B, an image position of the three-dimensional object included in the first luminance image 212a and an image position of the three-dimensional object included in the second luminance image 212b may be different from each other in a horizontal direction because of a difference in imaging position between the imaging units 110. As used herein, the term "horizontal" refers to a lateral direction of the captured image, and the term "vertical" refers to a longitudinal direction of the captured image.

The position calculator 170 may generate a distance image 214 as illustrated in FIG. 4C on the basis of the acquired first luminance image 212a illustrated in FIG. 4A and the acquired second luminance image 212b illustrated in FIG. 4B. The distance image 214 may allow for determination of a distance from the own vehicle 1 to a captured object.

For example, the position calculator 170 may calculate parallax information including a parallax and an image position by so-called pattern matching. The image position may indicate a position of any block in the image. Further, the position calculator 170 may extract any block from one of the luminance images (the first luminance image 212a, in this example) and search for a block corresponding to the extracted block in the other luminance image (the second luminance image 212b, in this example). A block may include, for example but not limited to, an array of four pixels in the horizontal direction by four pixels in the vertical direction. The pattern matching is a method to search for a block corresponding to any block extracted from one luminance image in the other luminance image.

Non-limiting examples of a function for evaluating a matching level between blocks in pattern matching may include the sum of absolute differences (SAD) that obtains luminance differences, the sum of squared intensity differences (SSD) that uses squared differences, and the normalized cross correlation (NCC) that obtains similarity of variance obtained by subtracting an average luminance value from the luminance value of each pixel.

The position calculator 170 may perform such a block-based parallax calculation process, for example, for all of the blocks present in a detection region of 600 pixels by 200 pixels. In this example, the position calculator 170 may perform the process on the basis of a block of four pixels by four pixels; however, this is non-limiting. The position calculator 170 may perform the process for any number of pixels.

The position calculator 170 may convert the parallax information for each block in the distance image 214 into a three-dimensional position in an actual space including a horizontal distance x, a height y, and a relative distance z by a so-called stereo method. The stereo method may be a method of calculating the relative distance z of any block with respect to the imaging unit 110 on the basis of a parallax of the block in the distance image 214 by a triangulation method. The position calculator 170 may calculate the height y of the block from the road surface on the basis of: the relative distance z of the block; and a detection distance on the distance image 214 from the block to a point on the road surface having the same relative distance z as the block. Further, the position calculator 170 may associate the calculated three-dimensional position with the distance image 214. The process of calculating the relative distance z and the process of determining the three-dimensional position may use any of various publicly known techniques, and is therefore not described further here.

[Three-Dimensional Object Determination Process S202]

The three-dimensional object determination unit 172 may group the blocks in such a manner as to put any two or more blocks that are located above a road surface, have the same color value, and have three-dimensional positions on the distance image 214 differing from each other within a predetermined range in a group, and thereby determine three-dimensional objects. For example, the three-dimensional object determination unit 172 may group the blocks assuming that any two or more blocks that have horizontal distances x differing from each other within a predetermined range, heights y differing from each other within a predetermined range, and relative distances z differing from each other within a predetermined range belong to the identical identification object. The predetermined range may be, for example but not limited to, 0.1 m. Thus, the three-dimensional object determination unit 172 may generate virtual block groups.

Figure 5A:
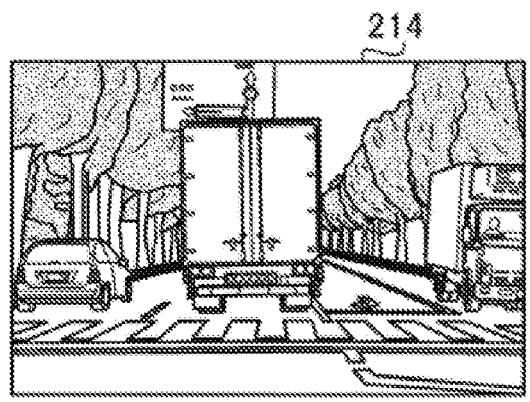
FIGS. 5A to 5C are explanatory diagrams for describing an example of operation of a three-dimensional object determination unit.
Figure 5B:
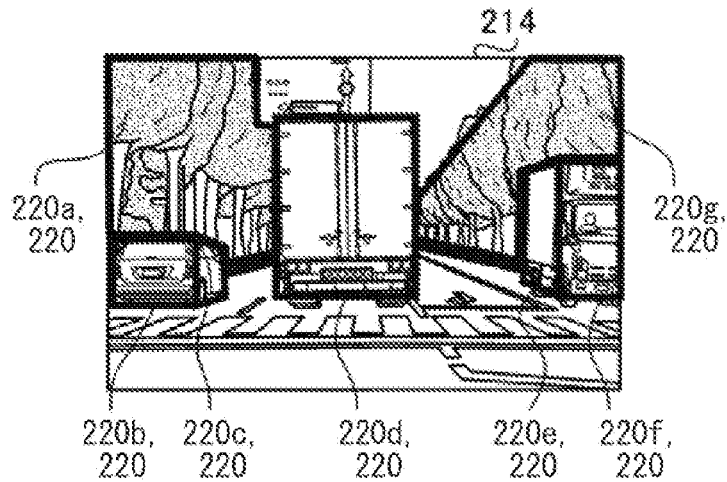
Figure 5C:
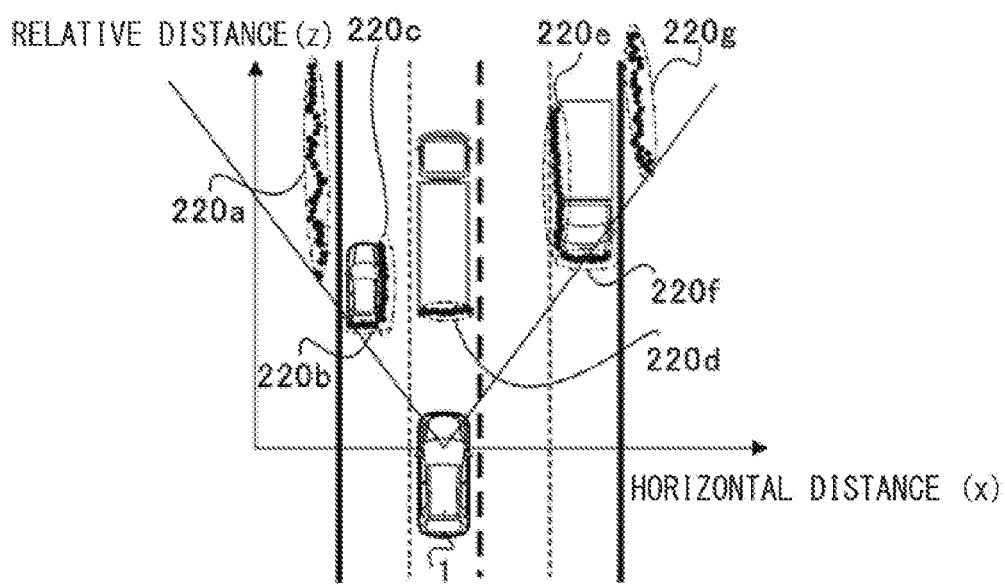

FIGS. 5A to 5C are explanatory diagrams for describing operation of the three-dimensional object determination unit 172. Now, assume an example case where the position calculator 170 has generated a distance image 214 as illustrated in FIG. 5A. The three-dimensional object determination unit 172 may group the blocks on the basis of the generated distance image 214. As a result, block groups based on such grouping may be extracted as illustrated in FIG. 5B. The three-dimensional object determination unit 172 may set an outline including all of the blocks in the group as a three-dimensional object 220 in FIG. 5B. For example, the three-dimensional object determination unit 172 may set a rectangular frame or a rectangular surface formed by horizontal lines and vertical lines or by lines extending in a depth direction and vertical lines as a three-dimensional object 220. Thus, the three-dimensional object determination unit 172 may determine three-dimensional objects 220a, 220b, 220c, 220d, 220e, 220f, and 220g illustrated in FIG. 5B.

The three-dimensional objects 220a, 220b, 220c, 220d, 220e, 220f, and 220g on the distance image 214 in FIG. 5B may be translated onto a two-dimensional horizontal plane represented by the horizontal distance x and the relative distance z as the three-dimensional objects 220*a*, 220*b*, 220*c*, 220*d*, 220*e*, 220*f*, and 220*g* illustrated in FIG. 5C.

[Identification Object Identifying Process S204]

The identification object identifying unit 174 may determine which identification object the three-dimensional object determined by the three-dimensional object determination unit 172 is. For example, the identification object identifying unit 174 may identify the three-dimensional object that is traveling in substantially the same direction as the own vehicle 1 in front of the own vehicle 1 as a preceding vehicle.

For example, the three-dimensional object determination unit 172 may determine the three-dimensional object 220*b* and the three-dimensional object 220*c* as different three-dimensional objects in FIG. 5C. However, in fact, the three-dimensional object 220*b* corresponds to a rear surface of the preceding vehicle and the three-dimensional object 220*c* corresponds to a side surface of the preceding vehicle. Therefore, the three-dimensional object 220*b* and the three-dimensional object 220*c* should be recognized as a pair of portions included in the one identical three-dimensional object. Similarly, the three-dimensional object 220*e* and the three-dimensional object 220*f* should be recognized as the identical three-dimensional object. Accordingly, the identification object identifying unit 174 may pair the three-dimensional objects 220 which are the rear surface and the side surface of the identical three-dimensional object.

Figure 6A:
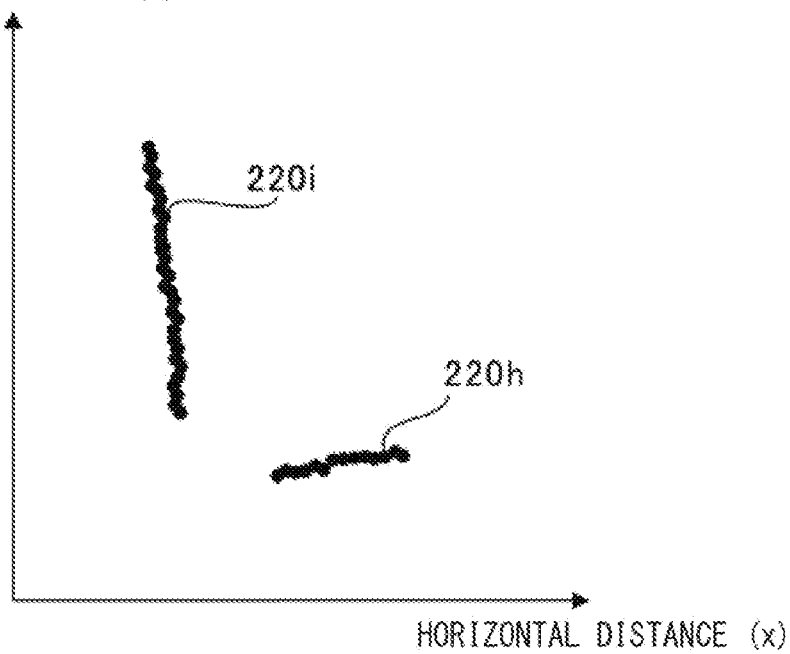
FIGS. 6A and 6B are explanatory diagrams for describing an example of operation of an identification object identifying unit.
Figure 6B:
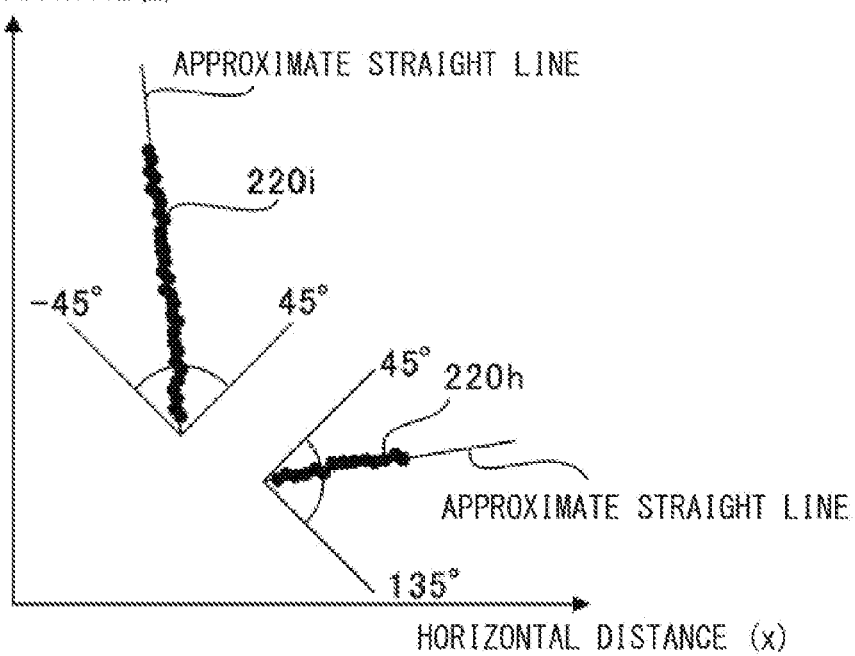

FIGS. 6A and 6B are explanatory diagrams for describing operation of the identification object identifying unit 174. FIGS. 6A and 6B are each projection of the three-dimensional objects 220 on a horizontal plane and represented only by the horizontal distance x and the relative distance z.

The identification object identifying unit 174 may project the three-dimensional objects 220 onto the horizontal plane and distinguish between the rear surface and the side surface on the basis of angles with respect to the depth direction. If a relationship between the rear surface and the side surface satisfies a predetermined condition, the identification object identifying unit 174 may pair the rear surface and the side surface to identify a pair.

For example, first, the identification object identifying unit 174 may calculate an angle of an approximate straight line of the three-dimensional object 220 with respect to an axis of the relative distance corresponding to the depth direction. If an absolute value of the calculated angle falls within a range that is greater than or equal to 45 degrees and less than 135 degrees, the identification object identifying unit 174 may identify the three-dimensional object 220 as the rear surface. If the absolute value of the calculated angle falls within a range that is greater than or equal to 0 (zero) degrees and less than 45 degrees or within a range that is greater than or equal to 135 degrees and less than or equal to 180 degrees, the identification object identifying unit 174 may identify the three-dimensional object 220 as the side surface.

For example, assume a case where the three-dimensional object determination unit 172 has determined three-dimensional objects 220*h* and 220*i* as illustrated in FIG. 6A as a result of grouping. In such an example case, the absolute value of the angle of the approximate straight line of the three-dimensional object 220*h* falls within the range that is greater than or equal to 45 degrees and less than 135 degrees, as illustrated in FIG. 6B. Therefore, the identification object identifying unit 174 may identify the three-dimensional object 220*h* as the rear surface. The absolute value of the angle of the approximate straight line of the three-dimensional object 220*i* falls within the range that is greater than or equal to 0 (zero) degrees and less than 45 degrees. Therefore, the identification object identifying unit 174 may identify the three-dimensional object 220*i* as the side surface. The identification object identifying unit 174 may be able to roughly distinguish between the rear surface and the side surface in such a manner.

In one example, the identification object identifying unit 174 may pair the rear surface and the side surface in a case: where a distance from the rear surface to the side surface falls within a range that is appropriate for portions of the same vehicle, for example, 2 meters; where the speed of the rear surface and the speed of the side surface are both stable; where the rear surface and the side surface both have lengths each of which is greater than or equal to a predetermined value, for example, 1 meter; and where a position of the middle of the rear surface and the side surface is present within the detection region. Such additional conditions for pairing may allow the identification object identifying unit 174 to appropriately limit the target of the pairing, which helps to reduce a process load.

For example, the identification object identifying unit 174 may determine whether the pair of the three-dimensional object 220*h* corresponding to the rear surface and the three-dimensional object 220*i* corresponding to the side surface satisfies a condition for a preceding vehicle. For example, the identification object identifying unit 174 may determine whether the three-dimensional object including the pair of the three-dimensional object 220*h* and the three-dimensional object 220*i* has a size appropriate as a vehicle, a shape appropriate as a vehicle, a relative speed appropriate as a vehicle, and a light emission source provided at a predetermined position on the rear side. Non-limiting examples of the light emission source may include a brake lamp and a high mount stop lamp. In a case where such a condition is satisfied, the identification object identifying unit 174 may identify the three-dimensional object 220 including the pair of the three-dimensional object 220*h* and the three-dimensional object 220*i* as the preceding vehicle.

In one example, the identification object identifying unit 174 may identify the three-dimensional object 220 as the preceding vehicle on the basis of a result of estimation performed by the later-described vehicle tracking unit 176 in a previous frame. For example, the identification object identifying unit 174 may identify the three-dimensional object 220 as the preceding vehicle if a difference between the position of the three-dimensional object determined by the three-dimensional object determination unit 172 and the position of the three-dimensional object 220 estimated by the vehicle tracking unit 176 falls within a predetermined range.

Further, the identification object identifying unit 174 may identify a three-dimensional object that stands on the side of the road in front of the own vehicle 1 as a sidewall.

For example, referring to FIG. 5C, the identification object identifying unit 174 may identify the three-dimensional object 220*a* that stands on the left side of the road as a left sidewall. Further, the identification object identifying unit 174 may identify the three-dimensional object 220*g* that stands on the right side of the road as a right sidewall. Typically, an integrated sidewall has continuity. Accordingly, for example, as illustrated in FIG. 5C, the identification object identifying unit 174 may determine each of the three-dimensional object 220*a* and the three-dimensional object 220*g* as a straight sidewall in a case where each of the three-dimensional object 220*a* and the three-dimensional object 220*g* has a straight-line trajectory on the horizontal plane. In a case where the three-dimensional object has a regular curve-line trajectory on the horizontal plane, for example, a trajectory having a constant curvature radius, the identification object identifying unit 174 may determine the three-dimensional object as a curved sidewall.

In one example, the identification object identifying unit 174 may determine each of the three-dimensional objects 220a and 220g as a sidewall in a case: where each of the three-dimensional objects 220a and 220g has a relative speed substantially the same as the speed of the own vehicle 1; where each of the three-dimensional objects 220a and 220g has a horizontal distance and a vertical distance from a road that stably fall within respective predetermined ranges; and where each of the three-dimensional objects 220a and 220g is continuous in the depth direction.

In a case where the identification object identifying unit 174 identifies the three-dimensional object 220 as the sidewall, the identification object identifying unit 174 may calculate, for example, an approximate curve line based on the least-squares method for the blocks belonging to the three-dimensional object 220. The identification object identifying unit 174 may associate the calculated approximate curve line with the three-dimensional object 220 as a trajectory of the side surface on the horizontal plane.

[Vehicle Tracking Process S206]

The vehicle tracking unit 176 may estimate a future position of the preceding vehicle to track the preceding vehicle. As used herein, the term "track" refers to determining whether the preceding vehicles identified in the respective frames are identical and calculating transition of movement over time of the preceding vehicles that are determined as being identical to thereby perform time-series management of the preceding vehicle.

Figure 7:
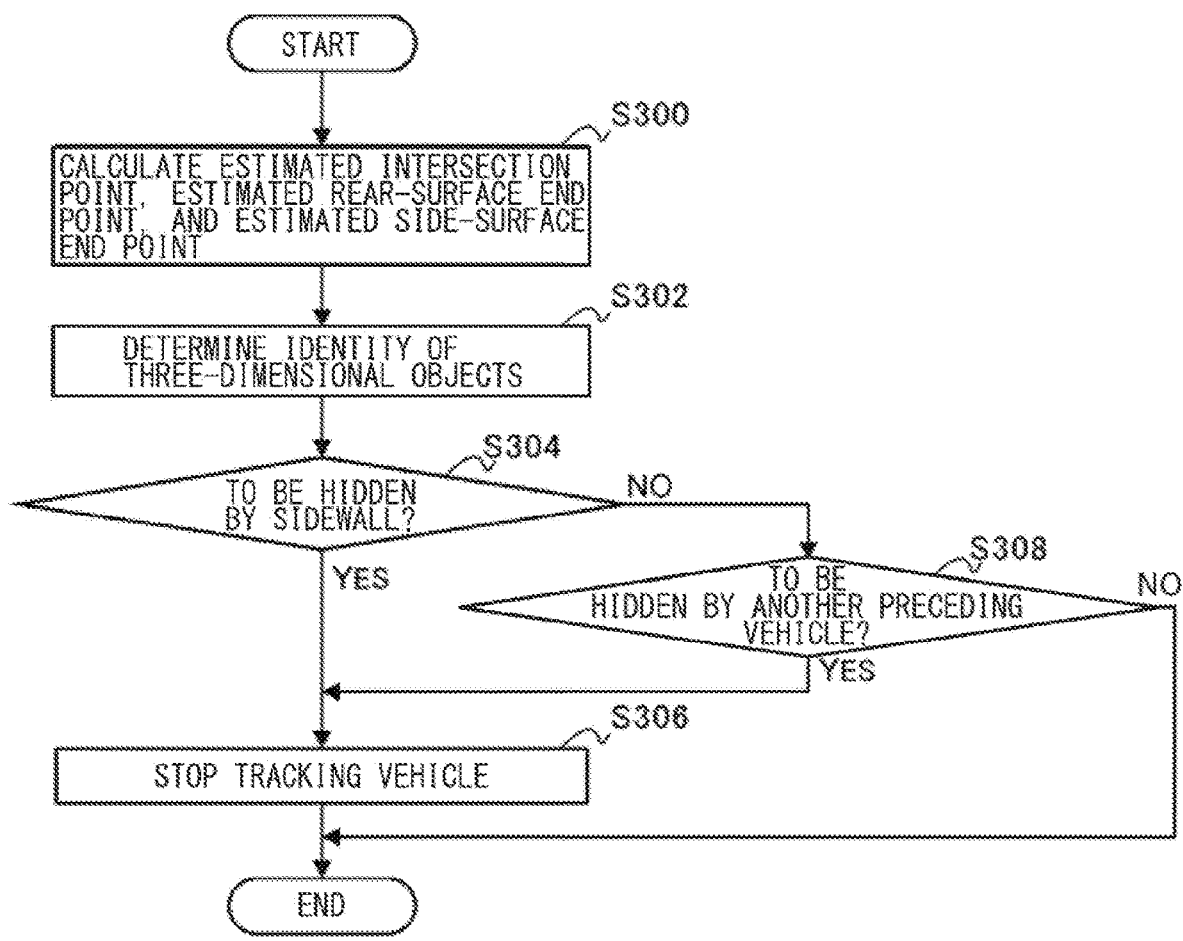
FIG. 7 is a flowchart illustrating an example of a flow of a vehicle tracking process.
Figure 8A:
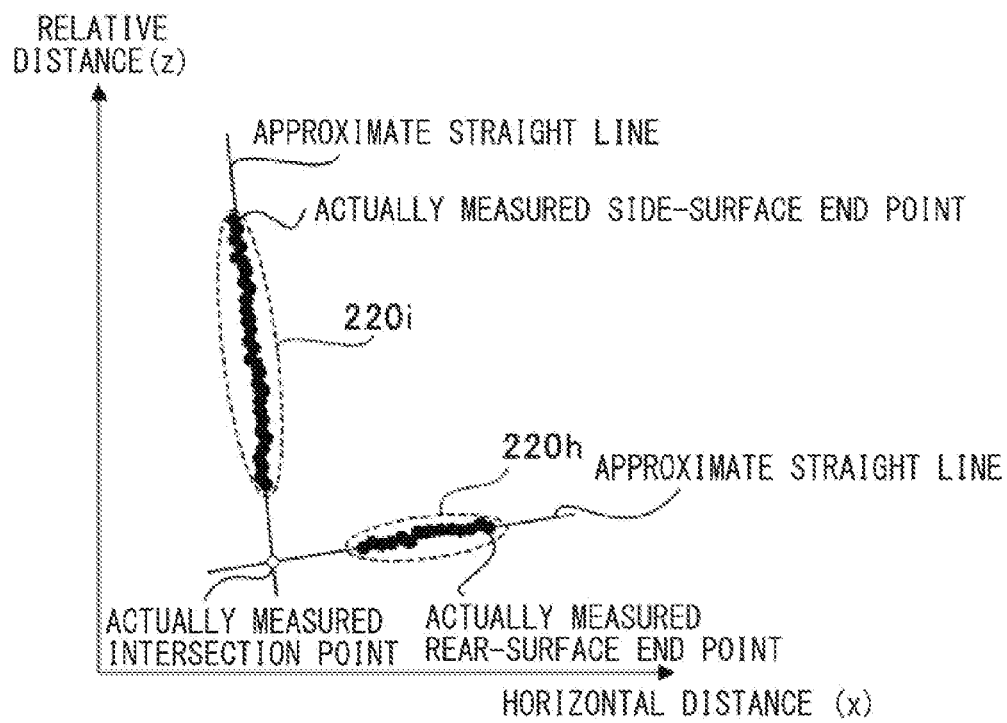
FIGS. 8A and 8B are explanatory diagrams for describing an example of operation of a vehicle tracking unit.
Figure 8B:
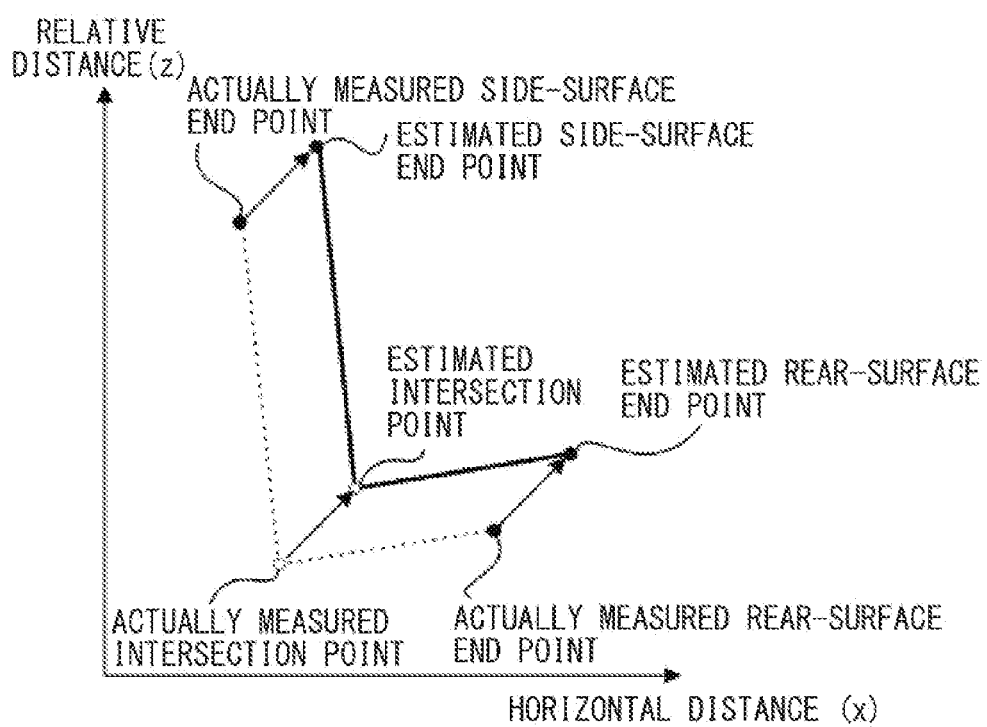

FIG. 7 is a flowchart illustrating a flow of the vehicle tracking process. FIGS. 8A and 8B are explanatory diagrams for describing operation of the vehicle tracking unit 176. The diagrams illustrated in FIGS. 8A and 8B are represented only by the horizontal distance x and the relative distance z. For example, assume a case where the three-dimensional object determination unit 172 has determined the three-dimensional objects 220h and 220i as illustrated in FIG. 8A. Further, assume that the identification object identifying unit 174 has paired the three-dimensional object 220h and the three-dimensional object 220i as a rear surface and a side surface, respectively, and has identified the pair as a preceding vehicle. Here, an intersection point of an approximate straight line of the blocks belonging to the three-dimensional object 220h and an approximate straight line of the blocks belonging to the three-dimensional object 220i may be set as an actually measured intersection point. Further, a point of a block that belongs to the three-dimensional object 220h and is farthest from the actually measured intersection point may be set as an actually measured rear-surface end point. Further, a point of a block that belongs to the three-dimensional object 220i and is farthest from the actually measured intersection point may be set as an actually measured side-surface end point.

As illustrated in FIG. 8B, the vehicle tracking unit 176 may use the actually measured intersection point, the actually measured rear-surface end point, and the actually measured side-surface end point as well as actually measured intersection points, actually measured rear-surface end points, and actually measured side-surface end points that have been calculated in the past for a plurality of times to calculate a next estimated intersection point, a next estimated rear-surface end point, and a next estimated side-surface end point by a method such as Kalman filtering (S300). On this occasion, the vehicle tracking unit 176 may estimate the next estimated intersection point, the next estimated rear-surface end point, and the next estimated side-surface end point, taking into consideration the relative speed, the angular velocity about the Y-axis, and ego-motion of each of the rear surface and the side surface. Further, the vehicle tracking unit 176 may store the result of estimation, i.e., the estimated intersection point, the estimated rear-surface end point, and the estimated side-surface end point, of the current frame in the data storage 152 for the next frame. It is to be noted that, although the vehicle tracking unit 176 may estimate the transition of the movement of the preceding vehicle on the basis of the points including the end points and the intersection point of the preceding vehicle in this example, this is non-limiting, and the vehicle tracking unit 176 may use any of a variety of existing techniques to estimate the transition of the movement.

Thereafter, the vehicle tracking unit 176 may read the result of the estimation in the previous frame from the data storage 152. The vehicle tracking unit 176 may compare the result of the actual measurement in the current frame including the actually measured intersection point, the actually measured rear-surface end point, and the actually measured side-surface end point with the result of the estimation in the previous frame to determine the identity of the three-dimensional objects (S302). For example, the vehicle tracking unit 176 may identify the result of the actual measurement in the current frame that has the shortest distance from the result of the estimation in the previous frame and differs in size of the three-dimensional object therefrom within a predetermined range. In a case where a difference in three-dimensional position between the identified result of the actual measurement in the current frame and the result of the estimation in the previous frame falls within a predetermined range, the vehicle tracking unit 176 may determine that the preceding vehicles in the respective frames are the identical preceding vehicle. In such a manner, the vehicle tracking unit 176 may be able to calculate the transition of the movement of the preceding vehicle to track in respective frames.

After the vehicle tracking unit 176 calculates the transition of the movement of the preceding vehicle to track, the vehicle external environment recognition apparatus 120 may use the calculated transition of the movement of the preceding vehicle to perform a control of reducing an influence of contact between the own vehicle 1 and the preceding vehicle, or to perform a following control of causing the own vehicle 1 to follow the preceding vehicle.

Sometimes, in a case where the own vehicle 1 is traveling on a curved road, the preceding vehicle to track is hidden by a sidewall present on the side of the road. This may prevent the own vehicle 1 from tracking the preceding vehicle and may possibly cause the own vehicle 1 to mistakenly recognize another identification object as the preceding vehicle to track.

Figure 9A:
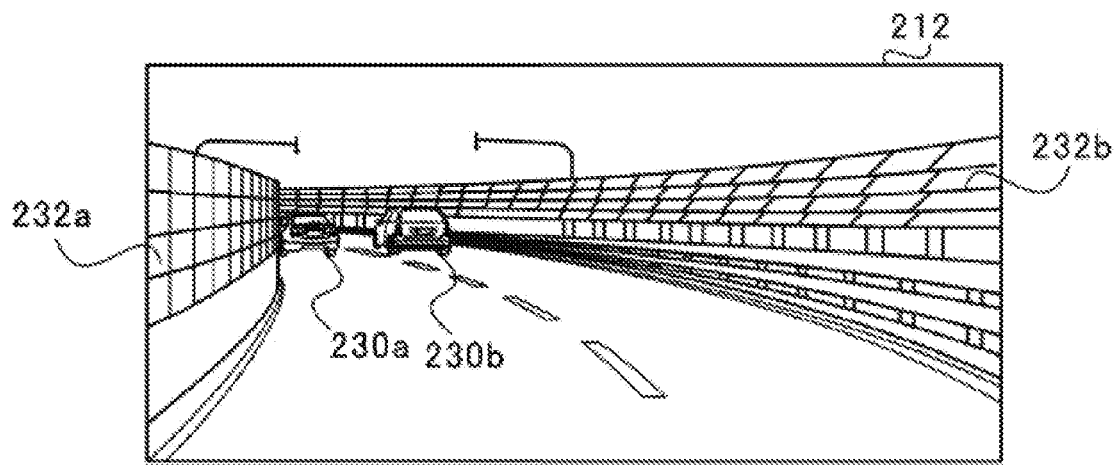
FIGS. 9A and 9B are explanatory diagrams for describing a traveling example of an own vehicle.
Figure 9B:
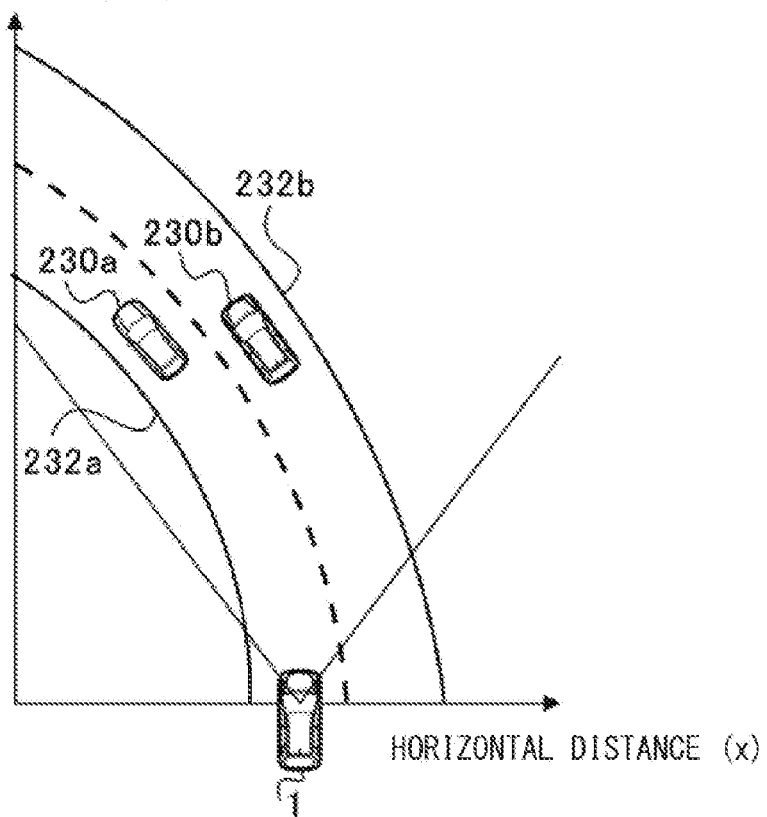

FIGS. 9A and 9B are explanatory diagrams illustrating a traveling example of the own vehicle 1. FIG. 9A illustrates the luminance image 212 in a case where the own vehicle 1 is traveling on a curved road. FIG. 9B illustrates a state of the detection region projected onto a horizontal plane. As illustrated in FIG. 9A, the own vehicle 1 is traveling on a road that is curved toward the left and two preceding vehicles 230a and 230b are present in front of the own vehicle 1.

In this example, sidewalls 232a and 232b are present on the respective sides of the curved road. In this case, there is a possibility that the identification object identifying unit 174 fails to identify the preceding vehicle 230a as an identification object depending on a positional relationship between the own vehicle 1 and the preceding vehicle 230a. For example, even if the preceding vehicle 230a is traveling on the lane as illustrated in FIG. 9B, the preceding vehicle 230a may be partially hidden by the sidewall 232a on the left when viewed from the own vehicle 1, as illustrated in FIG. 9A.

In a case where the preceding vehicle 230a is thus hidden by the sidewall 232a, it may be difficult for the three-dimensional object determination unit 172 to determine the entire three-dimensional object. This may lower the accuracy of the identification of the preceding vehicle 230a performed by the identification object identifying unit 174, and make the tracking of the preceding vehicle 230a by the vehicle tracking unit 176 unstable. Further, the vehicle tracking unit 176 may track the preceding vehicle with use of the result of the actual measurement in the current frame that has the shortest distance from the result of estimation for the current frame which has been performed in the previous frame. Therefore, if the preceding vehicle 230a is totally hidden by the sidewall 232a, the vehicle tracking unit 176 may possibly track, instead of the preceding vehicle 230a, the preceding vehicle 230b that is present near the preceding vehicle 230a and is similar in size to the preceding vehicle 230a.

To address this, the vehicle tracking unit 176 may determine whether the preceding vehicle 230a to track is to be hidden by the sidewall 232a in the future (S304).

Figure 10:
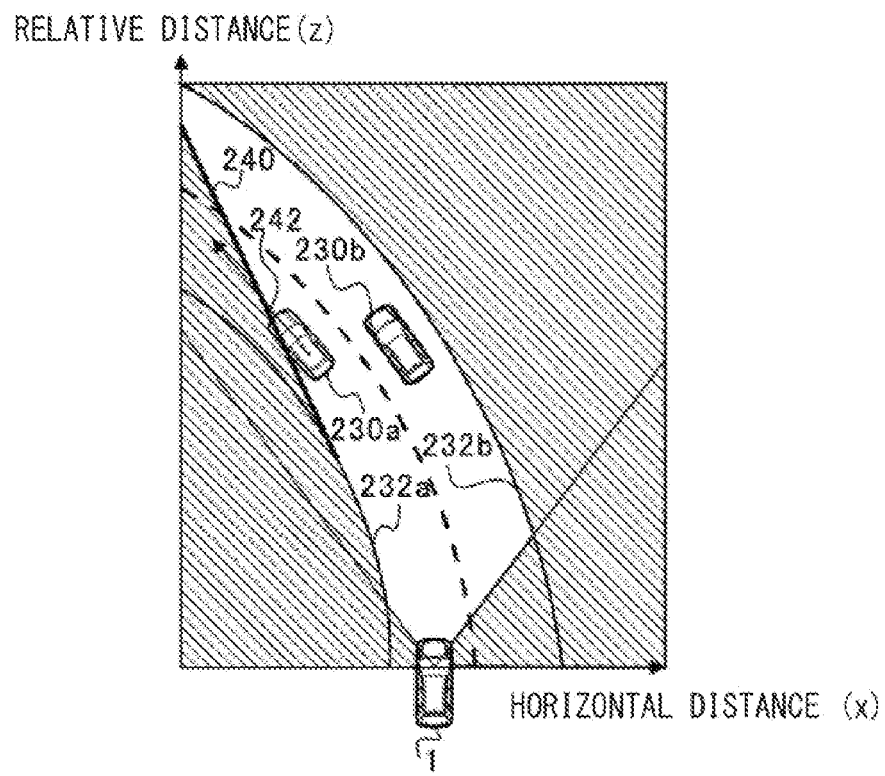
FIG. 10 is an explanatory diagram illustrating an example of the operation of the vehicle tracking unit.
Figure 11:
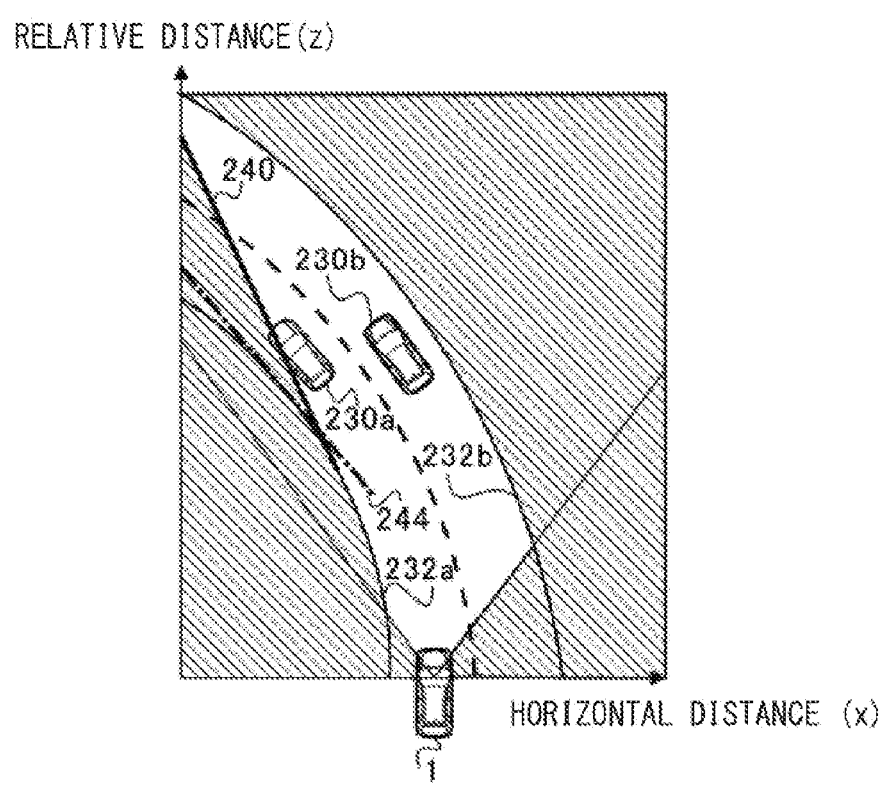
FIG. 11 is an explanatory diagram illustrating an example of the operation of the vehicle tracking unit.

FIGS. 10 and 11 are explanatory diagrams each illustrating operation of the vehicle tracking unit 176. In FIG. 10, blind regions of the imaging units 110 are hatched. Accordingly, a non-hatched region is a viewable region which the imaging units 110 are able to capture. The viewable region may depend on the blind regions of the imaging units 110, the trajectories of the sidewalls 232a and 232b, and the blind region made by the curve of the sidewall 232a.

A viewable-region border line 240 that indicates a border between the blind region made by the curve of the sidewall 232a and the viewable region is defined as follows. The viewable-region border line 240 represented by a thick line may refer to a tangent line to the approximate curve line of the sidewall 232a in a case where the trajectory of the sidewall 232a on the horizontal plane that passes through the imaging unit 110 of the own vehicle 1 is allowed to be approximated by a curve line, which is a straight line extending from the point of tangency of the approximate curve line of the sidewall 232a in the depth direction.

In a case where a velocity vector 242 starting from a center point of the preceding vehicle 230a to track intersects with the viewable-region border line 240 as illustrated in FIG. 10, the vehicle tracking unit 176 may determine that the preceding vehicle 230a is to be hidden by the sidewall 232a. Hereinafter, the velocity vector 242 starting from the center point of the preceding vehicle 230a to track is also simply referred to as the "velocity vector 242". With such a configuration, the vehicle tracking unit 176 is able to appropriately determine that the preceding vehicle 230a is to be hidden by the sidewall 232a.

In one example, the vehicle tracking unit 176 may determine that the preceding vehicle 230a is to be hidden by the sidewall 232a in a case where a tangent line 244 represented by a dash-dot-dash line in FIG. 11 intersects with the viewable-region border line 240. The tangent line 244 may be a tangent line, on the horizontal plane, to the approximate curve line of the sidewall 232a at a position of the preceding vehicle 230a in the depth direction. With such a configuration, the vehicle tracking unit 176 is able to appropriately determine that the preceding vehicle 230a is to be hidden by the sidewall 232a.

However, if the vehicle tracking unit 176 immediately determines that the preceding vehicle 230a is to be hidden by the sidewall 232a in a case where the velocity vector 242 or the tangent line 244 intersects with the viewable-region border line 240, the following issue may possibly arise. For example, due to noise, the preceding vehicle 230a may be determined as being to be hidden even in a case where such determination is inappropriate. In some cases, the following control may be unstable due to chattering. To address this, in a case where a condition for hiding determination is satisfied, for example, in a case where the velocity vector 242 or the tangent line 244 intersects with the viewable-region border line 240, the vehicle tracking unit 176 may count points in accordance with the satisfaction of the condition. Further, in a case where the counted points become a predetermined threshold or more, the vehicle tracking unit 176 may determine that the preceding vehicle 230a is to be hidden by the sidewall 232a.

For example, in a case where the velocity vector 242 or the tangent line 244 intersects with the viewable-region border line 240, the vehicle tracking unit 176 may increase a hiding point by one point. In a case where another identification object is present on the opposite side of the preceding vehicle 230a to the sidewall 232a, the vehicle tracking unit 176 may increase the hiding point by one point. In a case where the preceding vehicle 230a cannot be identified as an identification object, i.e., in a case where the preceding vehicle 230a does not have the relative distance z, the vehicle tracking unit 176 may increase a losing point by one point. It is to be noted that the vehicle tracking unit 176 may reset the hiding point and the losing point to zero in a case where the sidewall 232a is not present near the preceding vehicle 230a.

Further, in a case where the hiding point is greater than or equal to a predetermined value, for example, three points, the vehicle tracking unit 176 may determine that the preceding vehicle 230a is to be hidden by the sidewall 232a. In a case where the losing point is greater than or equal to a predetermined value, for example, two points, the vehicle tracking unit 176 may determine that the preceding vehicle 230a is to be hidden by the sidewall 232a. In one example, the vehicle tracking unit 176 may determine that the preceding vehicle 230a is to be hidden by the sidewall 232a in a case where the hiding point is greater than or equal to a predetermined value, for example, two points, and where the losing point is greater than or equal to a predetermined value, for example, two points. In one example, in a case where another identification object is present on the opposite side of the preceding vehicle 230a to the sidewall 232a, the vehicle tracking unit 176 may decrease the threshold for hiding determination in order to make it easier for the vehicle tracking unit 176 to determine that the preceding vehicle 230a is to be hidden by the sidewall 232a. With such a configuration, the vehicle tracking unit 176 is able to appropriately and stably determine that the preceding vehicle 230a is to be hidden by the sidewall 232a.

Now referring again to FIG. 7, in a case where the vehicle tracking unit 176 determines that the preceding vehicle 230a is to be hidden by the sidewall 232a as described above (YES in S304), the vehicle tracking unit 176 may stop tracking the preceding vehicle 230a (S306). For example, the vehicle tracking unit 176 may exclude the preceding vehicle 230a determined as being to be hidden by the sidewall 232a from the target to track. With such a configuration, the preceding vehicle 230a may be excluded from the target to track at an early timing. This helps to prevent the vehicle tracking unit 176 from failing to track the preceding vehicle 230a and to prevent the vehicle tracking unit 176 from mistakenly recognize another identification object as the preceding vehicle to track. In a case where the vehicle tracking unit 176 determines that the preceding vehicle 230a is not to be hidden by the sidewall 232a (NO in S304), the process may be caused to proceed to preceding-vehicle hiding determination S308 which will be described later.

Sometimes, in the case where the own vehicle 1 is traveling on a curved road, the preceding vehicle to track is hidden by another preceding vehicle that is traveling side by side with the preceding vehicle to track. As with the case where the preceding vehicle 230a to track is to be hidden by the sidewall 232a, this may also prevent the own vehicle 1 from tracking the preceding vehicle and may possibly cause the own vehicle 1 to mistakenly recognize another identification object as the preceding vehicle to track.

Figure 12A:
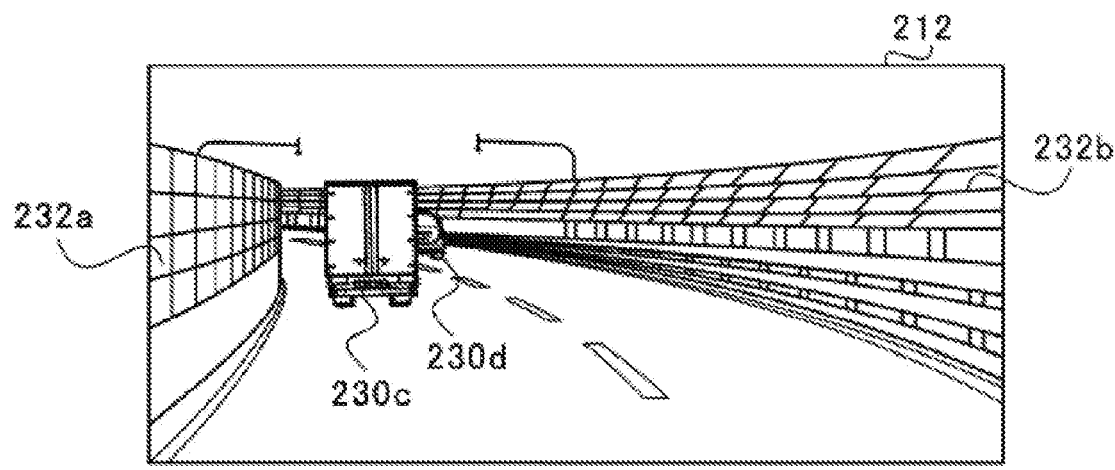
FIGS. 12A and 12B are explanatory diagrams illustrating a traveling example of the own vehicle.
Figure 12B:
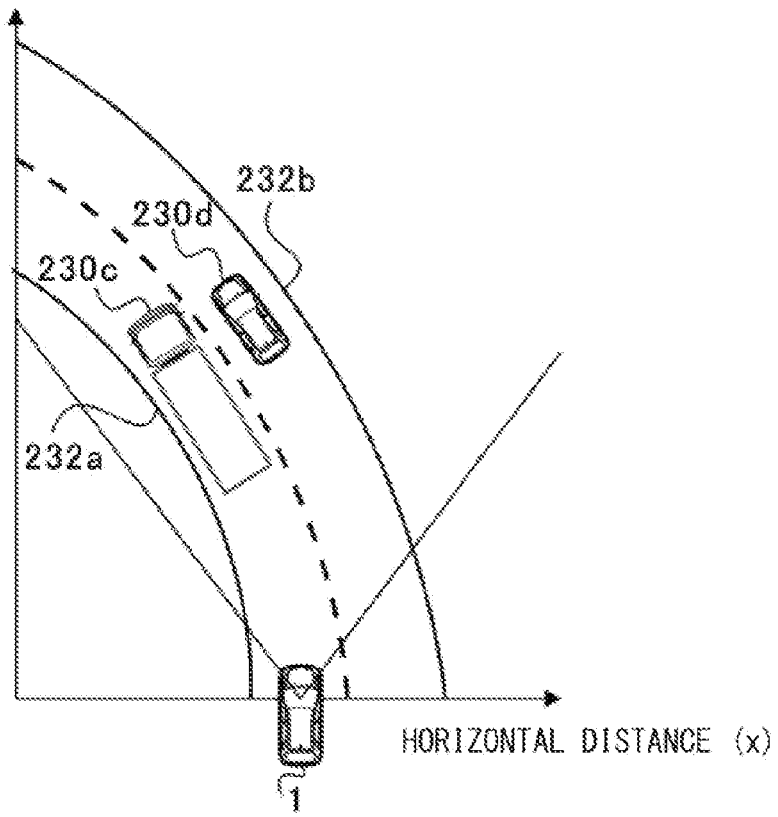

FIGS. 12A and 12B are explanatory diagrams illustrating a traveling example of the own vehicle 1. FIG. 12A illustrates the luminance image 212 in a case where the own vehicle 1 is traveling on a curved road. FIG. 12B illustrates a state of the detection region projected onto a horizontal plane. As illustrated in FIG. 12A, the own vehicle 1 is traveling on a road that is curved toward the left and two preceding vehicles 230c and 230d are present in front of the own vehicle 1. In addition, the sidewalls 232a and 232b are present on the sides of the curved road.

In this case, there is a possibility that the identification object identifying unit 174 fails to identify the preceding vehicle 230d as an identification object depending on a positional relationship between the own vehicle 1 and the preceding vehicles 230c and 230d. For example, even if the preceding vehicle 230d is traveling on the lane as illustrated in FIG. 12B, the preceding vehicle 230d may be partially hidden by the preceding vehicle 230c present on the left side of the preceding vehicle 230d when viewed from the own vehicle 1 as illustrated in FIG. 12A. If the preceding vehicle 230d is totally hidden by the preceding vehicle 230c, the vehicle tracking unit 176 may mistakenly recognize the sidewall 232b that is present near the preceding vehicle 230d as the preceding vehicle 230d.

To address this, the vehicle tracking unit 176 may determine whether the preceding vehicle 230d to track is to be hidden by the preceding vehicle 230c on the basis of positional relationships between two or more preceding vehicles, i.e., a positional relationship between the preceding vehicles 230c and 230d in this example (S308).

Figure 13A:
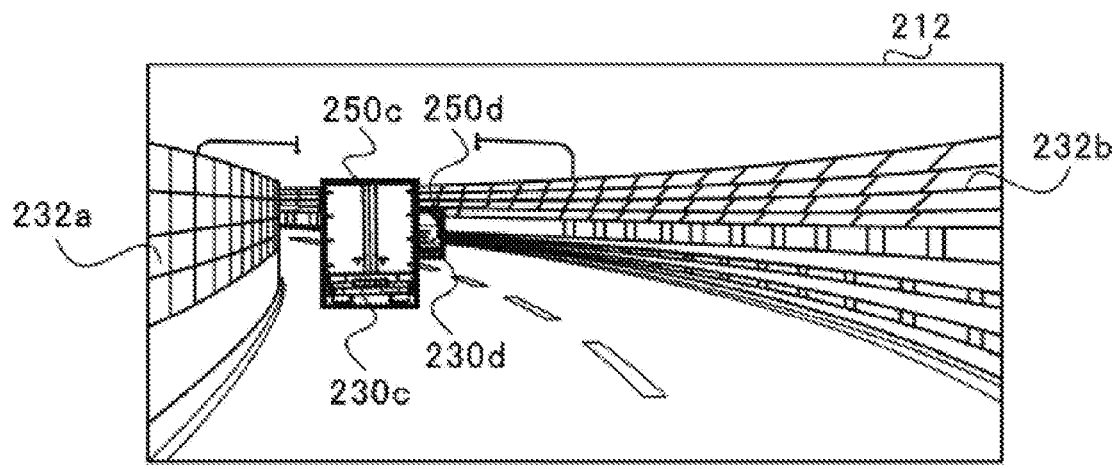
FIGS. 13A and 13B are explanatory diagrams illustrating an example of the operation of the vehicle tracking unit.
Figure 13B:
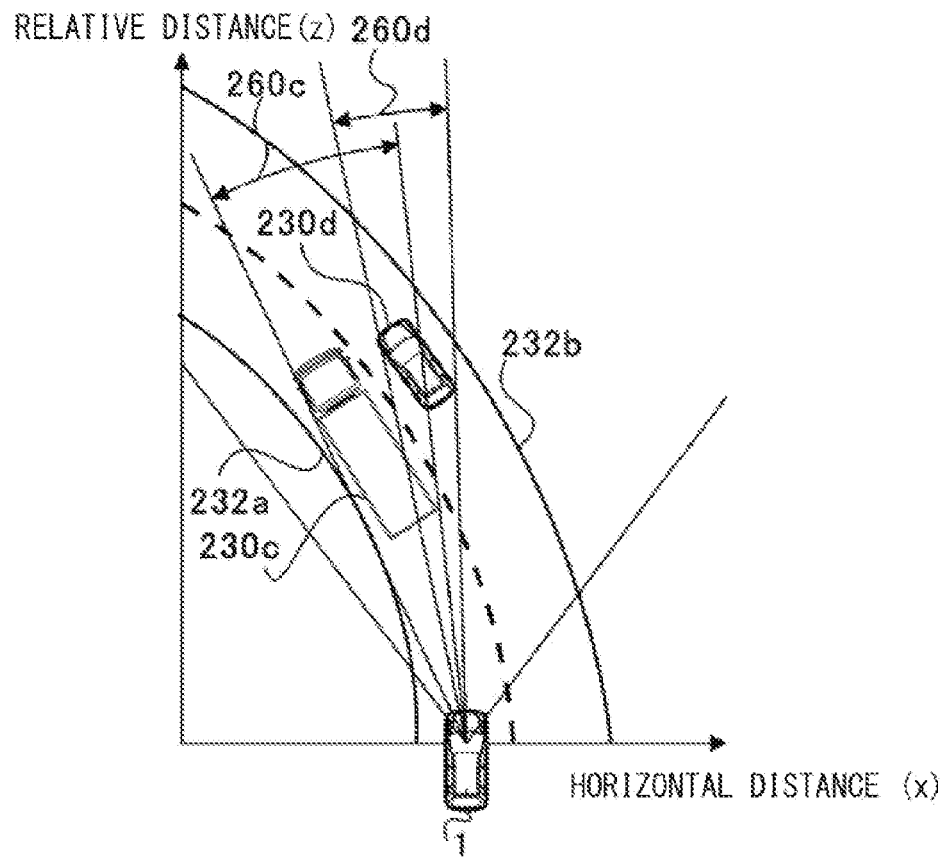

FIGS. 13A and 13B are explanatory diagrams each illustrating operation of the vehicle tracking unit 176. The vehicle tracking unit 176 may use the luminance image 212 in the current frame illustrated in FIG. 13A, and determine whether an outline 250c representing the preceding vehicle 230c and an outline 250d representing the preceding vehicle 230d are in contact with each other in the luminance image 212. In other words, the vehicle tracking unit 176 may determine whether there is no gap between the outline 250c and the outline 250d in the luminance image 212. In a case where the outline 250c and the outline 250d are in contact with each other, the vehicle tracking unit 176 may determine that the preceding vehicle 230d is to be hidden by the preceding vehicle 230c. With such a configuration, the vehicle tracking unit 176 is able to appropriately determine that the preceding vehicle 230d is to be hidden by the preceding vehicle 230c.

Further, the vehicle tracking unit 176 may use a computational space illustrated in FIG. 13B, and determine whether a region 260c overlaps with a region 260d on an x-z plane. The region 260c may be a region that radially expands from the own vehicle 1 and is occupied by the preceding vehicle 230c in the distance image 214. The region 260d may be a region that radially expands from the own vehicle 1 and is occupied by the preceding vehicle 230d in the distance image 214. On this occasion, the vehicle tracking unit 176 may identify the position of the preceding vehicle 230d on the basis of a result of estimation performed by the vehicle tracking unit 176 in the previous frame. In a case where the region 260c radially expanding from the own vehicle 1 and the region 260d radially expanding from the own vehicle 1 overlap with each other on the x-z plane, the vehicle tracking unit 176 may determine that the preceding vehicle 230d is to be hidden by the preceding vehicle 230c. With such a configuration, the vehicle tracking unit 176 is able to appropriately determine that the preceding vehicle 230d is to be hidden by the preceding vehicle 230c. Moreover, in the example illustrated in FIG. 13B, the vehicle tracking unit 176 may perform determination on the basis of not only the result of estimation in the current frame but also of an amount of the movement of the preceding vehicle 230d in the current frame from the preceding vehicle 230d in the previous frame. Therefore, the vehicle tracking unit 176 is able to perform the hiding determination with higher accuracy.

Further, in a case where a condition for the hiding determination is satisfied, for example, in a case where the outline 250c and the outline 250d are in contact with each other, the vehicle tracking unit 176 may count points in accordance with the satisfaction of the condition. Further, in a case where the counted points become a predetermined threshold or more, the vehicle tracking unit 176 may determine that the preceding vehicle 230d is to be hidden by the preceding vehicle 230c.

For example, in a case where the outline 250c and the outline 250d are in contact with each other, the vehicle tracking unit 176 may increase the hiding point by one point. In a case where the region 260c and the region 260d overlap with each other on the x-z plane as illustrated in FIG. 13B, the vehicle tracking unit 176 may increase the hiding point by two points. In a case where another identification object is present on the opposite side of the preceding vehicle 230d to the preceding vehicle 230c, the vehicle tracking unit 176 may increase the hiding point by one point. In a case where the preceding vehicle 230d cannot be identified as an identification object, i.e., in a case where the preceding vehicle 230d does not have the relative distance z, the vehicle tracking unit 176 may increase the losing point by one point. It is to be noted that the vehicle tracking unit 176 may reset the hiding point and the losing point to zero in a case where the other preceding vehicle 230c traveling side by side with the preceding vehicle 230d is not present near the preceding vehicle 230d.

Further, in a case where the hiding point is greater than or equal to a predetermined value, for example, three points, the vehicle tracking unit 176 may determine that the preceding vehicle 230d is to be hidden by the preceding vehicle 230c. In a case where the losing point is greater than or equal to a predetermined value, for example, two points, the vehicle tracking unit 176 may determine that the preceding vehicle 230d is to be hidden by the preceding vehicle 230c. In one example, the vehicle tracking unit 176 may determine that the preceding vehicle 230d is to be hidden by the preceding vehicle 230c in a case where the hiding point is greater than or equal to a predetermined value, for example, two points, and where the losing point is greater than or equal to a predetermined value, for example, two points. In one example, the threshold for determination as to that the preceding vehicle 230d is to be hidden by the preceding vehicle 230c may be decreased in a case where another identification object is present on the opposite side of the preceding vehicle 230d to the preceding vehicle 230c. With such a configuration, the vehicle tracking unit 176 is able to appropriately and stably determine that the preceding vehicle 230d is to be hidden by the preceding vehicle 230c.

Now referring again to FIG. 7, in a case where the vehicle tracking unit 176 determines that the preceding vehicle 230d is to be hidden by the preceding vehicle 230c as described above (YES in S308), the vehicle tracking unit 176 may stop tracking the preceding vehicle 230d. For example, the vehicle tracking unit 176 may exclude the preceding vehicle 230d determined as being to be hidden by the preceding vehicle 230c from the target to track. With such a configuration, the preceding vehicle 230d may be excluded from the target to track at an early timing. This helps to prevent the vehicle tracking unit 176 from failing to track the preceding vehicle 230d and to prevent the vehicle tracking unit 176 from mistakenly recognize another identification object as the preceding vehicle to track. In a case where the vehicle tracking unit 176 determines that the preceding vehicle 230d is not to be hidden by the preceding vehicle 230c (NO in S308), the vehicle tracking process S206 may be ended without stopping tracking the preceding vehicle 230d.

FIG. 7 illustrates an example in which the vehicle tracking unit 176 executes both of the process of determining whether the preceding vehicle 230a to track is to be hidden by the sidewall 232a in the future (S304) and the process of determining whether the preceding vehicle 230d to track is to be hidden by the preceding vehicle 230c (S308); however, this is non-limiting. In one example, the vehicle tracking unit 176 may execute only one of the above-described processes.

In addition, a program for causing a computer to serve as the vehicle external environment recognition apparatus 120 and a computer-readable storage medium in which the program is recorded may be also provided. In this example, the program may be adapted for data processing and may be written in any language or any description method. Non-limiting examples of the computer-readable storage medium may include a flexible disk, a magneto-optical disk, a ROM, a compact disc (CD), a digital versatile disc (DVD), and a Blu-ray Disc (BD, registered trademark).

Although some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the example embodiment has been described above referring to an example where the sidewall 232a and the other preceding vehicle 230c are present on the left side of the preceding vehicle 230a and the preceding vehicle 230d to track, respectively; however, this is non-limiting. It goes without saying that a similar process may be applicable to a case, for example, where the sidewall and the other preceding vehicle are present on the right side of the preceding vehicle 230a and the preceding vehicle 230d, respectively.

It is to be noted that the processes in the vehicle external environment recognition method described herein are not necessarily executed in time series in the order described in the flowchart. In one example, the processes may be executed in parallel. In another example, a sub-routine process may be additionally provided.

Each of the vehicle control unit 130, the central control unit 154, the position calculator 170, the three-dimensional object determination unit 172, the identification object identifying unit 174, and the vehicle tracking unit 176 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the vehicle control unit 130, the central control unit 154, the position calculator 170, the three-dimensional object determination unit 172, the identification object identifying unit 174, and the vehicle tracking unit 176 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the vehicle control unit 130, the central control unit 154, the position calculator 170, the three-dimensional object determination unit 172, the identification object identifying unit 174, and the vehicle tracking unit 176 illustrated in FIG. 2.

The invention claimed is:

1. A vehicle external environment recognition apparatus to be applied to a vehicle, the vehicle external environment recognition apparatus comprising:
   one or more processors; and
   one or more memories configured to be coupled to the one or more processors, wherein:
   the one or more processors are configured to cooperate with one or more programs included in the one or more memories to
      calculate three-dimensional positions of respective blocks in a captured image,
      group the blocks to put any two or more of the blocks that have the three-dimensional positions differing from each other within a predetermined range in a group and thereby determine three-dimensional objects,
      identify a preceding vehicle relative to the vehicle and a sidewall on a basis of the determined three-dimensional objects, and
      estimate a future position of the preceding vehicle to track the preceding vehicle, and
   the one or more processors are configured to determine, upon tracking the preceding vehicle, whether the preceding vehicle to track is to be hidden by the sidewall on a basis of a border line between a blind region and a viewable region, and upon determining that the preceding vehicle is to be hidden by the sidewall, the one or more processors are configured to stop tracking the preceding vehicle.

2. The vehicle external environment recognition apparatus according to claim 1, wherein the one or more processors are configured to determine that the vehicle is hidden when a total number of points obtained by satisfying a condition become a predetermined threshold or more.

3. A vehicle external environment recognition apparatus to be applied to a vehicle, the vehicle external environment recognition apparatus comprising:
   one or more processors; and
   one or more memories configured to be coupled to the one or more processors, wherein
   the one or more processors are configured to cooperate with one or more programs included in the one or more memories to
      calculate three-dimensional positions of respective blocks in a captured image,
      group the blocks to put any two or more of the blocks that have the three-dimensional positions differing from each other within a predetermined range in a group and thereby determine three-dimensional objects,
      identify two or more preceding vehicles relative to the vehicle on a basis of the determined three-dimensional objects, the preceding vehicles including a first preceding vehicle, and
      estimate a future position of the first preceding vehicle to track the first preceding vehicle, and
   the one or more processors are configured to:
      determine, upon tracking the first preceding vehicle, whether the first preceding vehicle to track is to be hidden by a second preceding vehicle on a basis of a positional relationship between the preceding vehicles, the second preceding vehicle being one of the preceding vehicles other than the first preceding vehicle, and
      upon determining that the first preceding vehicle is to be hidden by the second preceding vehicle, stop tracking the first preceding vehicle.

4. The vehicle external environment recognition apparatus according to claim 3, wherein the one or more processors are configured to determine that the vehicle is hidden when a total number of points obtained by satisfying a condition become a predetermined threshold or more.

* * * * *